Oct. 13, 1964      E. O. MUELLER      3,152,557
ELECTRIC TRACTION TRUCK OF THE PARALLEL DRIVE TYPE
Filed Feb. 11, 1963      3 Sheets-Sheet 2

United States Patent Office 3,152,557
Patented Oct. 13, 1964

3,152,557
ELECTRIC TRACTION TRUCK OF THE
PARALLEL DRIVE TYPE
Erich O. Mueller, Irwin, Pa., assignor to Westinghouse
Electric Corporation, Pittsburgh, Pa., a corporation of
Pennsylvania
Filed Feb. 11, 1963, Ser. No. 257,470
4 Claims. (Cl. 105—108)

The present invention relates to electric traction trucks and more particularly to the driving gear arrangement for electric traction trucks.

The well known so-called parallel drive gear arrangement for electric traction trucks is noted for its simplicity, ruggedness and dependability in service. Recent rapid transit developments have concentrated on increases in power and reductions in weight to achieve the desired characteristics of economical high speed rapid transit operation. In order to lighten the traction truck framing, inside journal bearing truck arrangements are preferred. However, such inside journal truck frames necessarily reduce the space available for mounting the electric motors and associated gear drives. Also, in order to reduce the unsprung weight carried by the truck axles, it is preferable to support the electric motor from the truck frame thus requiring some form of misalignment coupling between the electric motor shaft and the gearing on the truck axle. Some previous designs of inside bearing trucks have employed high hypoid gear angle drives and rearranged motor support arrangements with flexible misalignment couplings to fit the required mechanisms in the reduced truck space of an inside journal. It would be more desirable to retain the parallel gear drive with its attendant advantages, if such drive and the desired size of high power electric motor and flexible couplings could be fitted into the available space of an inside journal bearing truck.

A principal object of the present invention is to provide an electric traction truck having an improved form of parallel gear drive in which the space occupied by the electric motor and gear drive is reduced to enable such mechanisms to fit between the side frames of an inside journal bearing truck frame or the like even though relatively large and high power electric motors are used.

Another object of the present invention is to provide an electric traction truck of the parallel gear drive type having an improved flexible coupling between the electric motor and the gear drive mechanism in an arrangement such as to reduce the space occupied by the flexible coupling between the motor and the gear drive so that the entire driving mechanism and motor may be readily fitted into the limited space between the side frames of an inside journal bearing truck or the like.

In accordance with the invention, an inside journal bearing traction truck is provided with at least one electric motor supported from a truck frame cross member with its motor shaft generally parallel to the axis of a pair of truck wheels. One end of a gear case is journalled on the wheel axle with the other end of the gear case flexibly supported from the truck frame at a position near one end of the electric motor shaft. A driven gear is mounted on the axle within the gear case and is meshed with a driving gear journalled in the gear case near the end of the electric motor shaft. In accordance with the invention, a flexible coupling is provided between the one end of the electric motor shaft and the driving gear in the gear case in an arrangement to minimize the axial distance through the motor coupling and gear case. In the preferred form of the invention the flexible coupling is arranged to be substantially concentric with the driving gear in the gear case so that the entire mechanism of electric motor, flexible coupling and gear case may be readily fitted in the reduced space between the side members of an inside journalled bearing electric traction truck or the like.

Further objects, features and the attendant advantages of the invention will be apparent with reference to the following specification and drawings, in which.

Figure 1:
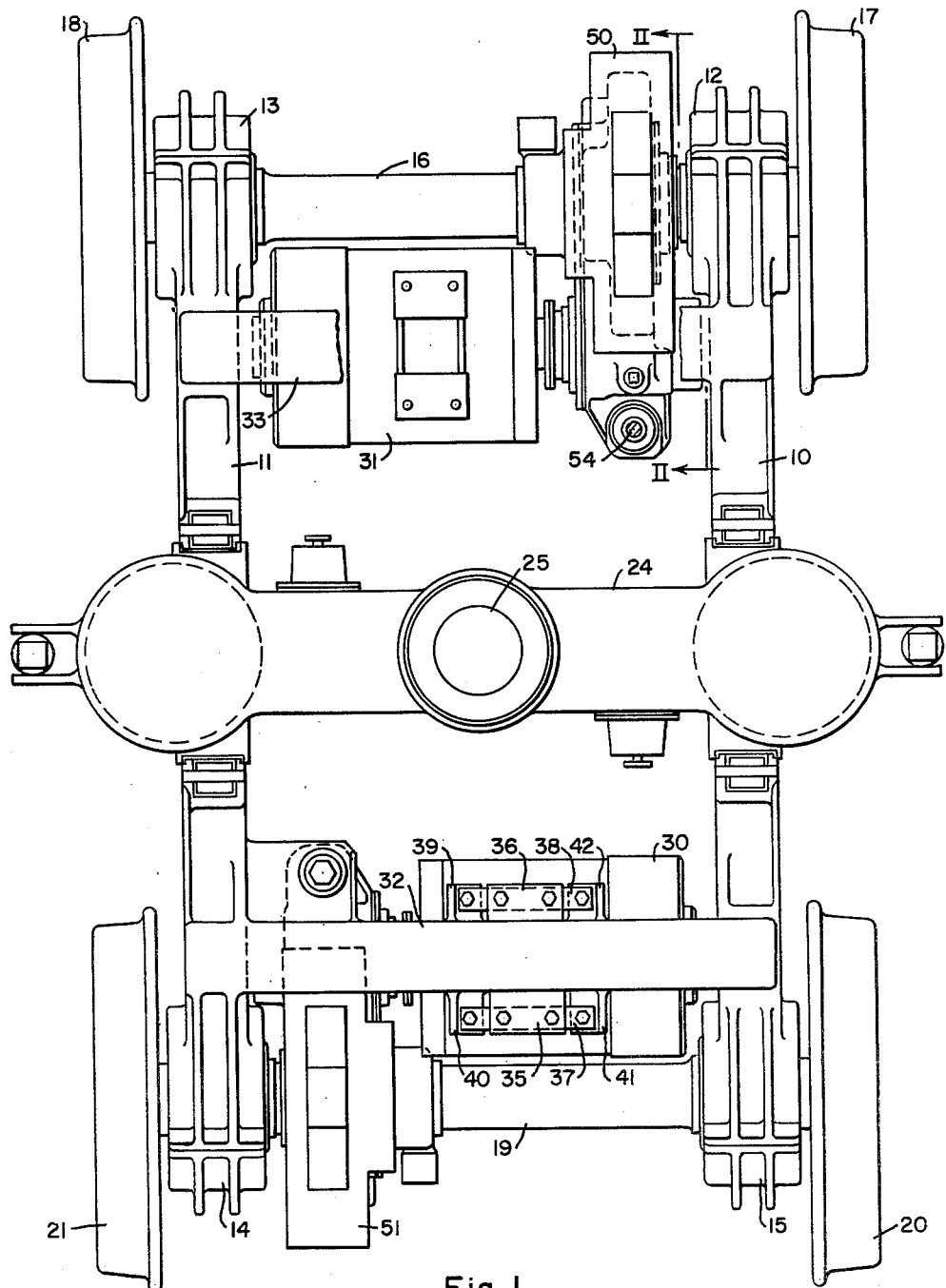
FIGURE 1 is a top plan view of a parallel drive electric traction truck embodying the invention but showing fragments only of some details of the truck which are not a part of the invention.
Figure 2:
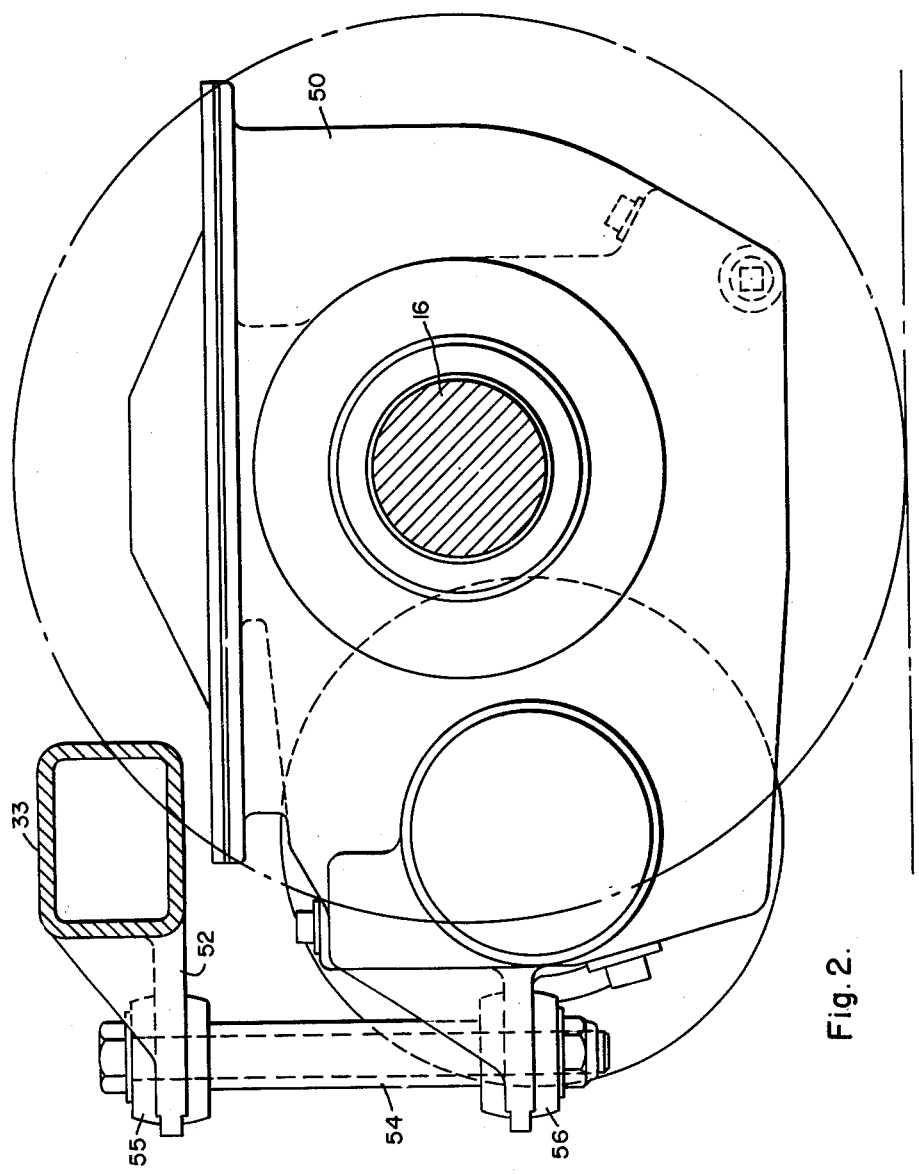
FIGURE 2 is a side elevational view on the line II-II of FIGURE 1.

Referring now to FIGS. 1 and 2 of the drawings, it will be seen that the electric traction truck is comprised of side frame members 10 and 11 having inside journal bearings 12-15. The axle 16 with wheels 17 and 18 is journalled in bearings 12 and 13 while the axle 19 with wheels 20 and 21 is journalled in bearings 14 and 15. A spring mounted body bolster 24 having the king-pin bearing arrangement 25 for supporting the car body is shown only generally since the details of the bolster arrangement do not form a part of the present invention.

Electric traction motors 30 and 31 are supported from truck frame cross members 32 and 33 respectively. It should be understood that the invention is not limited to a two-motor truck as illustrated but may be also used with a single motor truck as will be obvious to those skilled in the art. The detailed arrangement for supporting each electric traction motor from its respective truck frame cross member are also not a part of the present invention and a typical arrangement is shown to include brackets 35 to 36 such as carried by the traction motor 30 and bolted to cross pieces 37 and 38 which are in turn bolted to integral ear portions 39–42 of the truck frame cross member 32. Rubber cushions or springs not shown may be employed in the support for the traction motor if desired.

Each truck axle 16, 19 when arranged to be driven by an associated electric traction motor 30, 31 is provided with a gear case 50, 51 journalled on the respective truck axle at one end thereof. The other end of each gear case such as the gear case 50 is flexibly supported from an integral web or flange portion 52 of the truck frame cross member 33 by means of a support arm 54 and rubber bushings 55 and 56. Since the truck axle 16 is resiliently journalled in the truck frame, the end of the gear casing 50 that is journalled on the truck axle 16 will move up and down and sideways relative to the truck frame as the wheels and axles move. Also the other end of the gear case 50 that is flexibly supported by the support rod 54 will have a degree of movement as the truck axle 16 moves conventionally. It will be noted that the driving axis of each electric motor 30, 31 is generally parallel to the associated truck axle 16, 19 and since the associated gear case 50 and 51 is flexibly supported for movement relative to the truck frame, whereas the electric motors are not, a misalignment coupling must be provided between the electric motor shaft and the gearing within the associated gearing case 50, 51.

Figure 3:
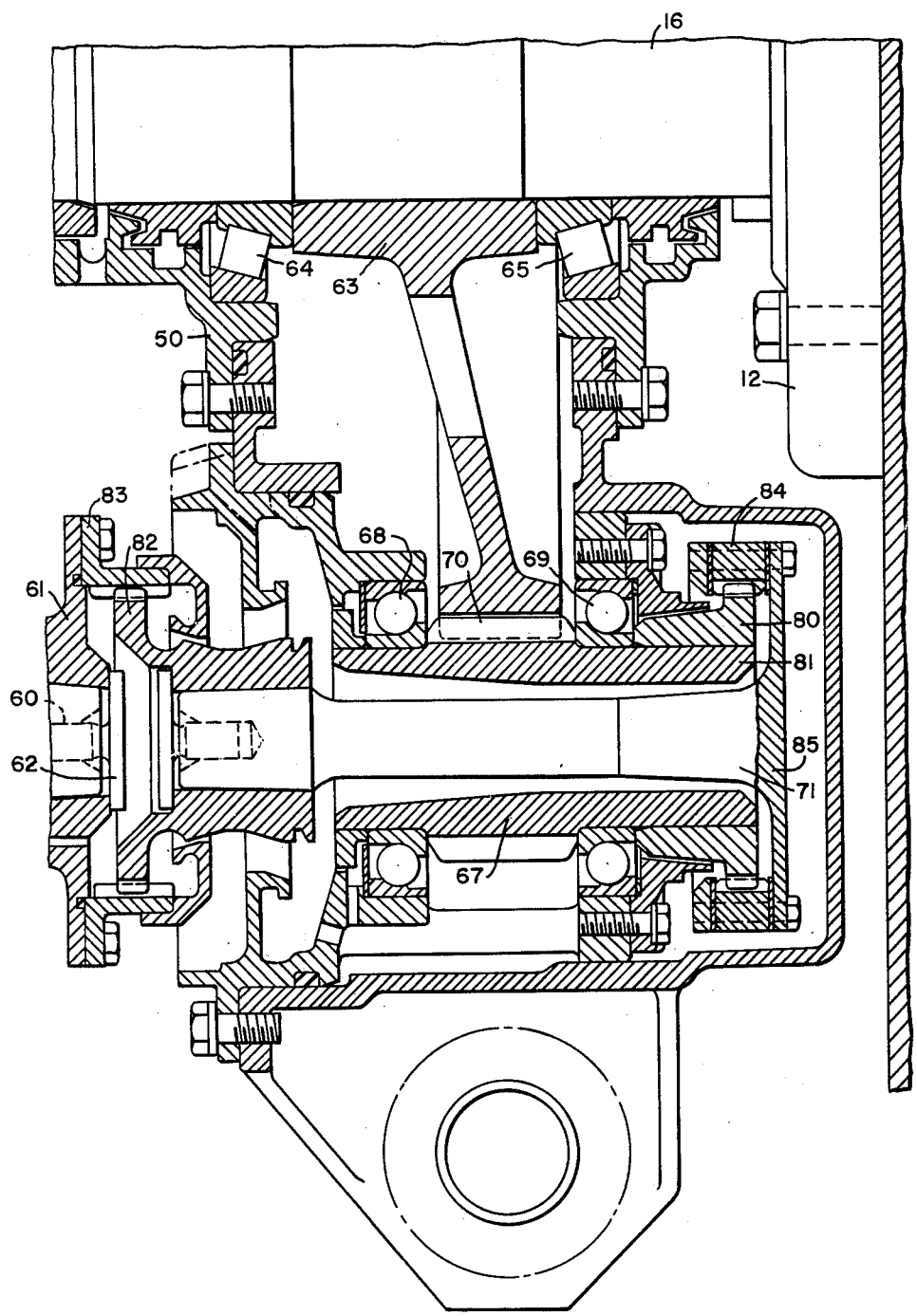
FIGURE 3 is a fragmentary detailed sectional view through the gear case to show the arrangement of gearing and flexible coupling of the invention.

Referring now to FIG. 3 of the drawings, the gear arrangement and the flexible coupling of the invention will be described as it is applied to the gear case 50 supported on the car wheel axle 16. One end 60 of the armature shaft for the traction motor 31 is shown to have a driving flange 61 secured by a tapered wedge fit and retaining nut 62. A driven gear 63 is secured in driving relation to the wheel axle 16 within the gear casing 50. Bearing races 64 and 65 rotatably journal the one end of the gear case 50 on the wheel axle 16. A driving gear 67 is rotably journalled by bearing races 68 and 69 within the other end of the gear casing 50 near the end of the electric motor armature shaft 60. The driving gear 67 meshes at 70 with the driven gear 63.

In accordance with the invention a flexible coupling that is substantially concentric with the driving gear 67 is interconnected between the end of the electric motor armature shaft 60 and the driving gear 67 in driving relationship. The driving gear 67 is provided with a hollow hub through which extends an interconnecting shaft or member 71 of the flexible coupling.

A first annular toothed spline coupling member or gear 80 is secured to a shoulder portion 81 of the hub of the hollow driving gear 67. A second annular toothed spline coupling shaft 71 adjacent the end of the electric motor armature shaft 60. A first internally toothed spline coupling member or gear 83 is bolted to the driving flange 61 of the end of the electric motor armature 60 and its teeth are mated with the teeth of the second annular spline member 82.

A second internally toothed spline or coupling member or gear 84 is secured to an integral flange portion 85 of the coupling shaft 71 in driving relation therewith and its internal teeth are meshed with the teeth of the first annular spline member 80. It should now be apparent that the rotation of the electric motor armature shaft 60 is transmitted by the respective spline couplings 82, 83 and 80, 84 through the coupling shaft 71 to the driving gear 67 in the gear case and the spline arrangements and shapes of the spline teeth are such as to permit limited axial and angular movement of the driving gear 67 within the gear case 50 relative to the electric motor shaft 60.

Since the flexible coupling arrangement including the coupling shaft 71 is substantially concentric with the driving gear 67 within the gear case 50, no additional space along the axis of the driving gear 67 and the electric motor armature shaft 60 is required for the misalignment coupling that must be provided in such parallel gear drive arrangements.

Although a specific form of splined concentric flexible coupling arrangement has been described, it should be understood that other arrangements of flexible couplings may be devised to be concentric to the driving gear of a parallel gear drive arrangement as taught by the present invention and the invention is therefore not limited only to the details of the precise spline coupling arrangement.

I claim as my invention:

1. In an electric traction truck of the type having an electric motor supported on a truck frame with its motor shaft generally parallel to a traction wheel axle that is resiliently journalled in the truck frame, the gear drive and misalignment coupling interconnecting the motor shaft and traction wheel axle comprising, a gear case journalled on said axle at one end and resiliently supported at its other end from said truck frame adjacent one end of said motor shaft, a driven gear secured to said axle within said one end of said case, a driving gear meshing with said driven gear and journalled in said case near said other end of said case, and flexible means interconnecting the one end of said motor shaft and said driving gear for driving said driving and driven gears by rotation of said motor shaft, said flexible means being positioned in substantially concentric alignment with said driving gear.

2. In an electric traction truck of the type having an electric motor supported on a truck frame with its motor shaft generally parallel to a traction wheel axle that is resiliently journalled in the truck frame, the gear drive and misalignment coupling interconnecting the motor shaft and traction wheel axle comprising, a gear case journalled on said axle at one end and resiliently supported at its other end from said truck frame adjacent one end of said motor shaft, a driven gear secured to said axle within one end of said case, a hollow hub driving gear meshing with said driven gear and journalled in said case near said other end of said case, and flexible means interconnecting the one end of said motor shaft and said driving gear for driving said driving and driven gears by rotation of said motor shaft, said flexible means extending through the hollow hub of said driving gear in substantially concentric alignment therewith.

3. In an electric traction truck of the type having an electric motor supported on a truck frame with its motor shaft generally parallel to a traction wheel axle that is resiliently journalled in the truck frame, the gear drive and misalignment coupling interconnecting the motor shaft and traction wheel axle comprising, a gear case journalled on said axle at one end and resiliently supported at its other end from said truck frame adjacent one end of said motor shaft, a driven gear secured to said axle within said one end of said case, a driving gear meshing with said driven gear and journalled in said case near said other end of said case, a first internally toothed spline gear secured to one end of said motor shaft near the other end of said case, a first annular toothed spline gear, mounted on the hub of said driving gear, a second internally toothed spline gear engaging said first annularly toothed spline gear, a second annularly toothed spline gear engaging said first internally toothed spline gear, and means rotatably interconnecting said second annularly toothed spline gear with said second internally toothed spline gear to thereby flexibly interconnect said motor shaft and said driving gear.

4. In an electric traction truck of the type having an electric motor supported on a truck frame with its motor shaft generally parallel to a traction wheel axle that is resiliently journalled in the truck frame, the gear drive and misalignment coupling interconnecting the motor shaft and traction wheel axle comprising, a gear case journalled on said axle at one end and resiliently supported at its other end from said truck frame adjacent one end of said motor shaft, a driven gear secured to said axle within said one end of said case, a hollow hub driving gear meshing with said driven gear and journalled in said case near said other end of said case, a first internally toothed spline gear secured to one end of said motor shaft near the other end of said case, a first annular toothed spline gear mounted on the hub of said driving gear, a second internally toothed spline gear engaging said first annularly toothed spline gear, a second annularly toothed spline gear engaging said first internally toothed spline ear, and means extending through the hollow hub of said driving gear and rotatably interconnecting said second annularly toothed spline gear with said second internally toothed spline gear to thereby flexibly interconnect said motor shaft and said driving gear.

References Cited in the file of this patent

UNITED STATES PATENTS

| | | |
|---|---|---|
| 1,602,983 | Ljungstrom | Oct. 12, 1926 |
| 1,813,140 | Bethel | July 7, 1931 |
| 1,987,419 | Ross | Jan. 8, 1935 |
| 2,024,688 | Gray | Dec. 17, 1935 |
| 3,007,350 | Wiseman | Nov. 7, 1961 |

FOREIGN PATENTS

| | | |
|---|---|---|
| 691,281 | Great Britain | May 6, 1953 |